(No Model.)
W. S. REESE.
HOISTING AND TIPPING APPARATUS.
No. 588,756. Patented Aug. 24, 1897.
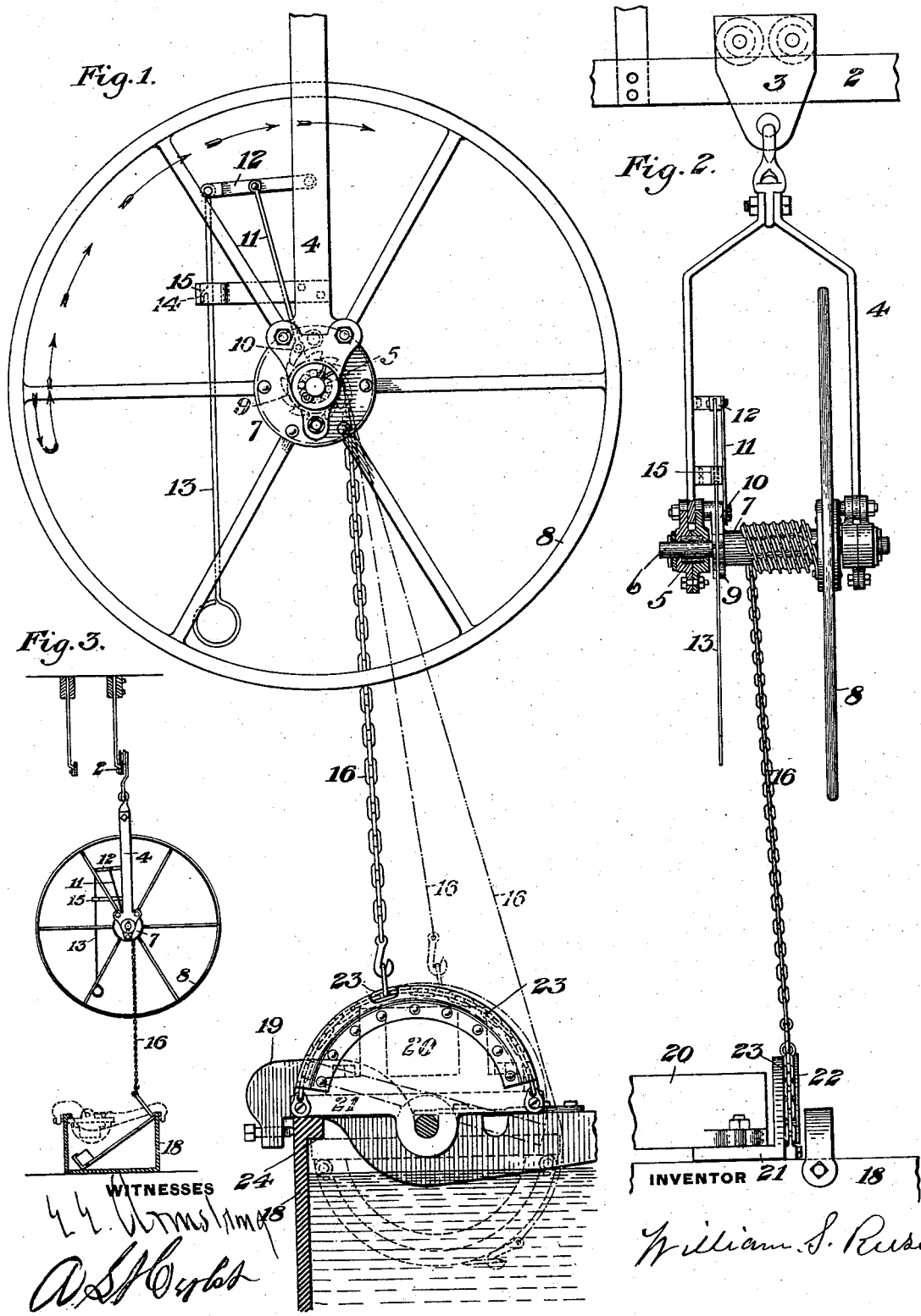

UNITED STATES PATENT OFFICE.

WILLIAM S. REESE, OF NATRONA, PENNSYLVANIA.

HOISTING AND TIPPING APPARATUS.

SPECIFICATION forming part of Letters Patent No. 588,756, dated August 24, 1897.

Application filed September 25, 1896. Serial No. 606,965. (No model.)

*To all whom it may concern:*

Be it known that I, WILLIAM S. REESE, of Natrona, in the county of Allegheny and State of Pennsylvania, have invented a new and useful Improvement in Hoisting and Tipping Apparatus, of which the following is a full, clear, and exact description, reference being had to the accompanying drawings, forming part of this specification, in which—

Figure 1 is a side elevation of my improved hoisting device in position for tipping a swinging mold. Fig 2 is a front elevation of the same partly broken away; and Fig. 3 is a side elevation on a smaller scale, showing the device arranged for transferring an ingot.

My invention relates to devices for hoisting and carrying loads from point to point, and more especially to such devices when arranged for the tipping of swinging molds, and is designed to provide a simple, cheap, and highly effective apparatus for this purpose.

In the drawings, 2 represents an overhead track having a trolley 3, which carries a yoke 4, each arm of which is provided at its lower end with a roller or ball bearing 5 for the shaft 6 of a winding-drum 7. This drum is provided at one end with a large hand-wheel 8 and at its other with a ratchet-wheel 9, which is engaged by a swinging pawl 10, pivoted to the yoke. To lift the pawl out of engagement with the ratchet-wheel, I provide a link 11, pivotally connecting the pawl with a swinging lever 12, which is pivoted to the yoke and is provided with a depending link 13, by which it is operated, this link 13 having a lug 14, arranged to take over a projecting bar 15 when the link is moved upwardly, thus holding the pawl in elevated inoperative position, if desired. A chain 16 is secured to and winds about the drum, and it is apparent that when this chain is secured to any load this load may be raised by rotating the hand-wheel, and the pawl locking the load in elevated position the device with its load may be moved along the track to any desired point, where the pawl being disengaged by the handle the load may be lowered.

When the device is employed for tipping molds, the chain is attached as shown in Figs. 1 and 2. In these figures, 18 represents the side of a water-bosh, and 19 the end bar of a frame which is carried on the bosh, within which frame are carried the end trunnions of a swinging mold 20. This mold 20 is carried upon end plates 21, bolted thereto, one of these end plates being provided with a segmental or semicircular casting 22, having a groove in its rim, within which is secured a section of chain 23. The overhead track is so arranged relatively to the water-bosh that the center of the winding-drum is considerably at one side of the center of the mold-trunnions, as shown in Fig. 1. The chain 16 is attached to the chain 23 at one side of a line drawn from the drum to the center of the mold-trunnion, and, moreover, the center of the circle upon which the edge of the casting 22 is struck does not coincide with the center of the mold-trunnions, but is at one side thereof and preferably between the center of the mold-trunnions and the point of attachment of the chain.

After the mold is filled the hand-wheel is rotated counter-clockwise until the chain 16 assumes a position, as shown in dotted lines in Fig. 1, a little to the right of a vertical line drawn through the mold-trunnion, after which a quick jerk is given to the wheel and it is then released and moves in a clockwise direction, as indicated by the arrows in Fig. 1. The weight of the mold and its contained metal having been moved so that its center of gravity is brought to one side of the mold-trunnions by the counter-clockwise movement of the wheel, it is evident that when the wheel is released the weight of the mold and its metal will swing the mold into position shown in dotted lines in Fig. 1, the end portion of the plate 21 striking an inwardly-projecting lug 24 on the bosh, so as to stop the further movement of the mold. In this position the chain 16 lies partly within the groove in the rim of the casting 22, and when it is desired to return the mold to its original position the hand-wheel is moved in a counter-clockwise direction until the chain 16 comes to about the position shown in dotted lines in Fig. 1, upon which a quick jerk is given to the wheel, and it then being released the mold swings to its original position.

The advantages of my invention are obvious, since the device is simple, cheap, and easily adapted to different conditions of work, and by its use heavy loads may be easily lifted and transferred from point to point. The single chain, on account of the peculiar relationship between the centers of the mold-trunnions, the drum, the point of attachment of the chain, and the circle of the casting 22, enables the mold to be emptied and returned to its original position, these movements being entirely under the control of the operator.

Many changes may be made in the form and arrangement of the parts without departing from my invention, since

I claim—

1. The combination with an overhead trolley, of a yoke depending therefrom, a drum carried in roller-bearings in said yoke, a hand-wheel secured to the drum, a ratchet-wheel secured to the drum-shaft, a swinging pawl engaging the ratchet-wheel, a lever having a link connection with the pawl, and a link connected to said lever and having a lug arranged to rest upon a projection of the yoke and hold the pawl in inoperative position; substantially as described.

2. The combination with a swinging mold having trunnions, and having at one end a curved rim, of an upper winding-drum located at one side of the mold-trunnions and having a depending chain secured to the curved-rim portion of the mold; substantially as described.

3. The combination with a swinging mold having trunnions, and having a curved portion struck on a circle whose center is at one side of the pivotal point of the mold, of a winding-drum located above and at one side of the pivotal point of the mold, and a chain arranged to wind on said drum and having its lower end secured to the curved portion of the mold; substantially as described.

4. The combination with a mold having trunnions upon which it swings, of a segmental plate having a grooved rim at the end of the mold, the edge of said rim being struck on a circle, the center of which is at one side of the center of the trunnions, an overhead winding-drum at one side of the mold-trunnions, and a chain extending from said drum to and secured to the curved rim at a point at one side of a line drawn from the drum to the center of the mold-trunnions; substantially as described.

In testimony whereof I have hereunto set my hand.

WILLIAM S. REESE.

Witnesses:
E. E. ARMSTRONG,
A. L. HERBST.